UNITED STATES PATENT OFFICE.

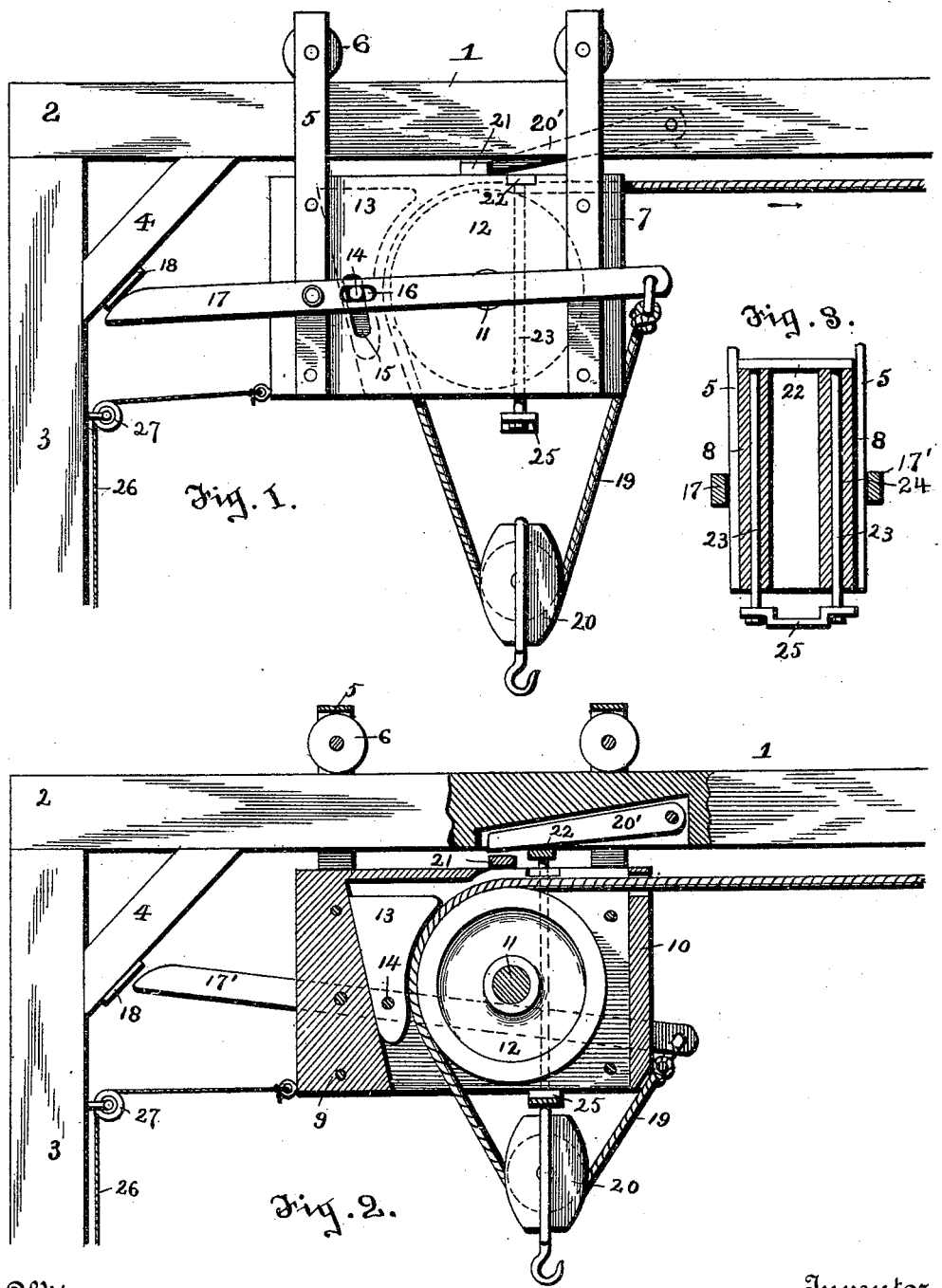

BRYANT R. SOCKMAN, OF MOUNT VERNON, OHIO.

HAY ELEVATOR AND CARRIER.

SPECIFICATION forming part of Letters Patent No. 457,856, dated August 18, 1891.

Application filed October 22, 1890. Serial No. 368,900. (No model.)

*To all whom it may concern:*

Be it known that I, BRYANT R. SOCKMAN, a citizen of the United States of America, residing at Mount Vernon, in the county of Knox and State of Ohio, have invented certain new and useful Improvements in Hay Elevators and Carriers, of which the following is a specification, reference being had therein to the accompanying drawings.

This invention relates to hay carriers and elevators.

The object of the invention is to produce a device which will elevate the load, release the carriage-detaining mechanism, and convey the said load to any desired point.

A further object is to produce a device which will automatically lock the carriage at a predetermined point and automatically release the rope-locking mechanism to allow the hay-fork to descend for a fresh load.

A further object is to produce a hay elevator and carrier which shall combine great simplicity of construction with high efficiency and durability in use and cheapness of production.

The invention consists in the various novel details of construction of a hay elevator and carrier, as will be hereinafter fully described in the specification, illustrated in the drawings, and more particularly pointed out in the claims.

In the accompanying drawings, forming part of this specification, and in which like numerals of reference indicate corresponding parts, I have illustrated one form of device embodying the essential features of my invention, although the same may be carried into effect in other ways without in the least departing from the spirit thereof; and in these drawings—

Figure 1 is a side elevation of the device, showing it as it appears when ready for use. Fig. 2 is a similar view, partly in section, showing the relative arrangement of the different parts; and Fig. 3 is a detached sectional view showing the trigger mechanism for releasing the carriage.

Referring to the drawings, 1 designates a track or runway, which is preferably arranged close to the comb of the building and extends from gable to gable and projects without the building, and carries on the projecting end 2 a downwardly-extending arm 3, which is braced by means of a beam 4. Supported upon the track by means of straps 5, carrying each a pulley 6, is a carriage 7, constructed of sides 8 and ends 9 and 10, the end 9 being approximately wedge shape in form, as shown in Fig. 2. Through the carriage extends a shaft 11, on which is journaled a grooved sheave or pulley 12, and immediately behind the pulley is placed a wedge 13, one face of which is curved to conform to the periphery of the pulley. The wedge is supported by a pin 14, which works in slots 15, formed in the sides of the carriage 7, and rests in openings 16, formed in levers 17 17', pivoted to the sides of the carriage back of the wedge. One end of each of the said levers is rounded and engages with a cross-piece 18, secured to the beam 4, and the opposite ends connect with a rope 19, which passes through a block 20 and over the pulley 12 and connects with a suitable source of power.

The mechanism for locking the carriage in its forward position consists of a pawl 20', which is journaled in a recess formed in the track 1 and is designed to engage with a cross-piece 21, secured to the top of the carriage. At a point slightly in advance of the cross-piece just referred to is mounted a similar cross-piece 22, which is secured to rods 23, moving in openings 24 in the carriage and carrying at their lower ends a strip 25, which is located in such position with regard to the block 20 that the latter will contact with it when in its raised position, as shown in Fig. 2.

All of the parts just referred to are to be made of any suitable material that will combine lightness and durability.

Having thus fully described my invention, I will describe the manner of its operation. The carriage being in the position shown in Fig. 1, the levers 17 are in engagement with the cross-piece 18, thereby lifting the wedge 13 out of engagement with the rope 19, thus allowing the pulley to turn freely, and the pawl 20 is in engagement with the cross-piece 21, thus preventing retrograde movement on the part of the carriage. The block, which carries an ordinary hay-fork, is now lowered and a suitable load is gathered by the fork. The horse, which is attached to the opposite end of the rope 18, is now started, thus lift- ing the block, and with it the load of hay, until the block reaches the position shown in Fig. 2, when it will contact with the strip 25, and thus throw the pawl out of engagement with the cross-piece 21 and release the carriage. As soon as the carriage starts to move forward, the pressure exerted upon the levers by the weight of the hay will cause them to move down and bring the wedge 13 into forcible engagement with the rope, thus preventing its descent. As soon as the hay has been discharged into the mow the carriage is drawn back to its normal position by means of a rope 26, which is secured to the fore end of the said carrier and passes over a pulley 27, secured to the arm 3.

By reason of the inclined end 9 of the carriage the releasing of the wedge is rendered more easy than were the said end left straight or vertical, as in the latter case there would be a tendency to binding.

Having thus fully described my invention, what I claim as new, and desire to secure by Letters Patent, is—

1. In a hay carrier and elevator, the combination, with a suitable track, of a carriage having side and end walls, one of the end walls being inclined, a pulley journaled in the carriage, a wedge mounted between the pulley and said inclined end, levers supporting the wedge, and a rope connecting the levers and pulley.

2. In a hay carrier and elevator, a carriage having side and end walls, one of the end walls being inclined, a pulley journaled in the carriage, a wedge mounted between the pulley and inclined end, levers supporting the wedge, and a trigger carried by the carriage, in combination with a track carrying a pawl engaging a fixed portion of the carriage.

3. In a hay carrier and elevator, a carriage having side and end walls, one of the end walls being inclined, a pulley journaled in the carriage, a wedge mounted between the pulley and inclined end, levers supporting the wedge, and a trigger carried by the carriage, in combination with a track carrying a pawl engaging a fixed portion of the carriage, and a cross-piece designed to be engaged by the levers.

In testimony whereof I affix my signature in presence of two witnesses.

BRYANT R. SOCKMAN.

Witnesses:
FRANK MOORE,
J. T. BURR.